UNITED STATES PATENT OFFICE.

HARRY C. PEFFER, OF EAST ST. LOUIS, ILLINOIS, ASSIGNOR TO ALUMINUM COMPANY OF AMERICA, OF PITTSBURG, PENNSYLVANIA, A CORPORATION OF PENNSYLVANIA.

REMOVAL OF SILICA IN THE MANUFACTURE OF ALUMINA.

938,432.   Specification of Letters Patent.   Patented Oct. 26, 1909.

No Drawing.   Application filed March 5, 1909.   Serial No. 481,382.

*To all whom it may concern:*

Be it known that I, HARRY C. PEFFER, a citizen of the United States, residing at East St. Louis, St. Clair county, Illinois, have invented a new and useful Improvement in the Removal of Silica in the Manufacture of Alumina, of which the following is a specification.

My invention relates to the manufacture of alumina, and is, more particularly a modification of, or an improvement upon the wet process, described in the patent of Charles M. Hall, No. 663,167 dated Dec. 4th 1900, its object being further elimination of silica in this process.

The process described and claimed in the said patent consists, briefly, in the digestion under heat and pressure, of a mixture of bauxite, carbonate of soda, and caustic lime, with sufficient water. In this process, carbonate of lime is formed, and the solution of aluminate of soda and the great bulk of the impurities in the bauxite—namely, silica, iron, titanic acid, etc.—remain undissolved. It has been found, however, that a small percentage of the silica goes into solution with the aluminate of soda and is precipitated with it in a subsequent process for precipitation, and thereby contaminates the alumina produced.

I have discovered that the small precentage of silica which remains in solution with aluminate of soda may be precipitated and effectually removed by the following method:

When a charge is taken from the digester as described in the above mentioned patent, it consists of a solution of aluminate of soda in water, mixed with a large amount of what is known as "red mud." This red mud consists of carbonate of lime with more or less caustic lime, and of the undissolved portion of the bauxite, consisting of silica, iron, titanic acid, bauxite, and undissolved alumina. It has hitherto been the practice to filter this material at once, separating the solution of aluminate of soda from the red mud. The silica is not, however, removed or separated from this filtered liquor unless it stands for a long time.

My invention consists in allowing the entire charge to stand for a period before filtering. The silica is thereby precipitated, and when the charge is finally filtered, a solution almost absolutely free from silica is obtained.

In order to get the best results, I find that it is advisable to allow the digester charges to remain, after removing from the digester, for a period of about six hours. If a longer time is allowed, the silica which is first precipitated seems to be re-dissolved. The charge which comes out of the digester at the boiling point gradually cools, but is not completely cooled when filtered. The charge may be agitated and kept in motion, but I have found that the best results are obtained by letting it stand quietly. After standing the prescribed time, or whatever time is found to give the best results, in any particular case, the charge is filtered in the usual way, and the solution of aluminate of soda is separated from the solid residuum.

While I have found that a period of six hours gives the best results, I do not limit myself to this period, as with different mixtures it may be found that a longer or shorter time will accomplish better results. Neither do I limit myself to a process in which the mixture is allowed to stand quietly, as for commercial reasons it may be better to agitate it.

One method of carrying out the process which is commercially practicable, and which gives good results, is to blow off the digester charge into a large tank of sufficient capacity to hold a large number of charges. Additional charges are added to this tank from time to time as the exigencies of the plant require, but the capacity of the tank is so proportioned to the number of charges that the average time which any charge is allowed to remain in the tank before removing and filtering is about six hours. In order to keep the material from settling and making it difficult to filter, it may be necessary—with a large tank and working on a large scale—to agitate the aluminate liquor with the red mud. This may be done by pumping it off from the bottom through a pipe and pumping it into the top, or in other ways which will be obvious to those skilled in the art.

What I claim as my invention and desire to secure by Letters Patent is:

1. The method of eliminating the silica in the process in which aluminate of soda is produced by digesting bauxite in such a way as to produce aluminate of soda, which consists in allowing the aluminate of soda liquor to remain in contact with the red mud for a sufficient time before filtering to cause the precipitation of the silica.

2. In a process for the manufacture of alumina in which bauxite is digested with lime and carbonate of soda to form aluminate of soda, the step which consists in allowing the aluminate of soda liquor to remain in contact with the red mud for a sufficient time to cause the precipitation of the silica.

3. In a process for the manufacture of alumina in which bauxite is dissolved to form a solution of aluminate of soda, the step which consists in delivering the digester charges to a tank capable of holding a number of such charges, and continually adding digester charges to the tank and withdrawing the same from time to time, whereby on the average a charge is allowed to remain therein for a sufficient time to effect the precipitation of the contained silica.

4. The method of eliminating the silica in the process in which aluminate of soda is produced by digesting bauxite in such a way as to produce aluminate of soda, which consists in allowing the aluminate of soda liquor to remain in contact with the red mud for about six hours.

5. In a process for the manufacture of alumina in which bauxite is dissolved to form a solution of aluminate of soda, the step which consists in delivering the digester charges to a tank capable of holding a number of such charges, and continually adding digester charges to the tank and withdrawing the same from time to time, whereby on the average a charge is allowed to remain therein for about six hours.

6. The method of eliminating the silica in the process in which aluminate of soda is produced by digesting bauxite in such a way as to produce aluminate of soda, which consists in allowing the aluminate of soda liquor to remain in contact with the red mud for a sufficient time before filtering to cause the precipitation of the silica and then filtering.

7. In a process for the manufacture of alumina in which bauxite is digested with lime and carbonate of soda to form aluminate of soda, the step which consists in allowing the aluminate of soda liquor to remain in contact with the red mud for a sufficient time to cause the precipitation of the silica and then filtering before the precipitated silica re-dissolves.

In testimony whereof, I have hereunto set my hand.

HARRY C. PEFFER.

Witnesses:
EDNA A. RAGLAND,
J. M. CHAMBERLIN, Jr.